Feb. 18, 1964 A. ALVAREZ-CALDERON 3,121,544
SAFETY AND HIGH LIFT SYSTEM AND APPARATUS FOR AIRCRAFT
Filed Jan. 8, 1962 5 Sheets-Sheet 1
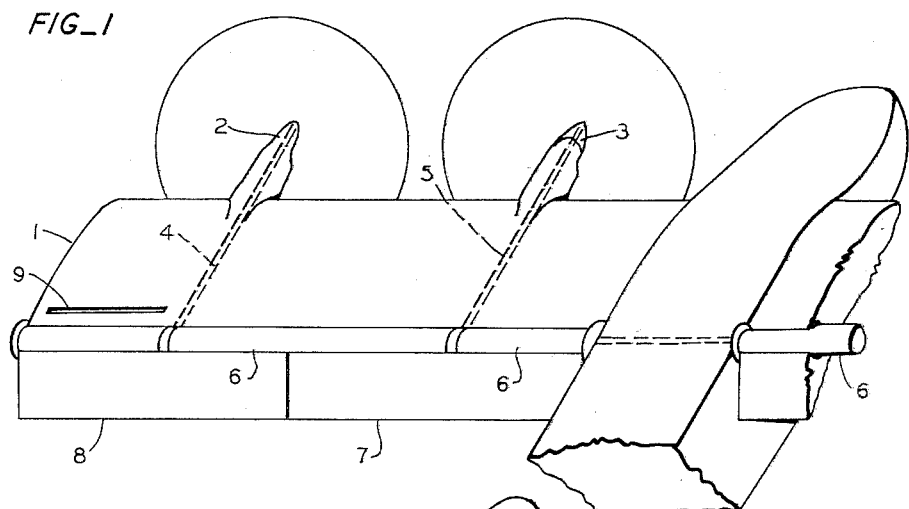
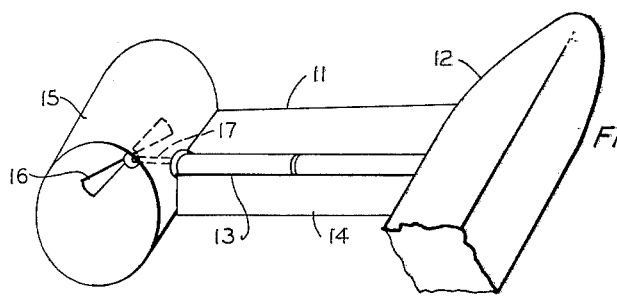
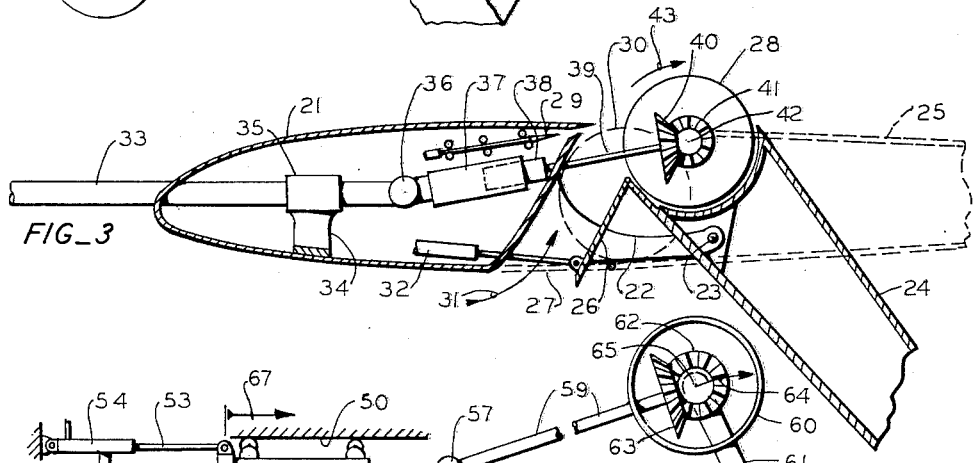
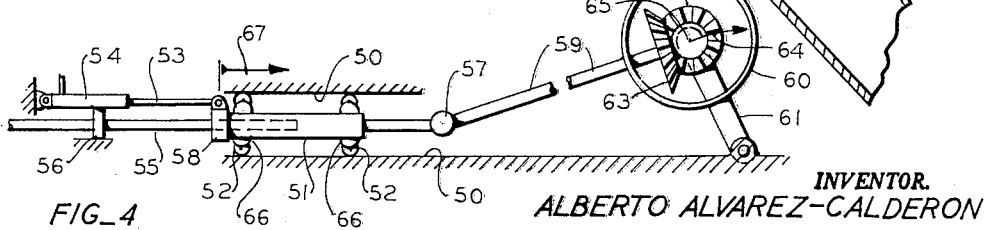
INVENTOR.
ALBERTO ALVAREZ-CALDERON

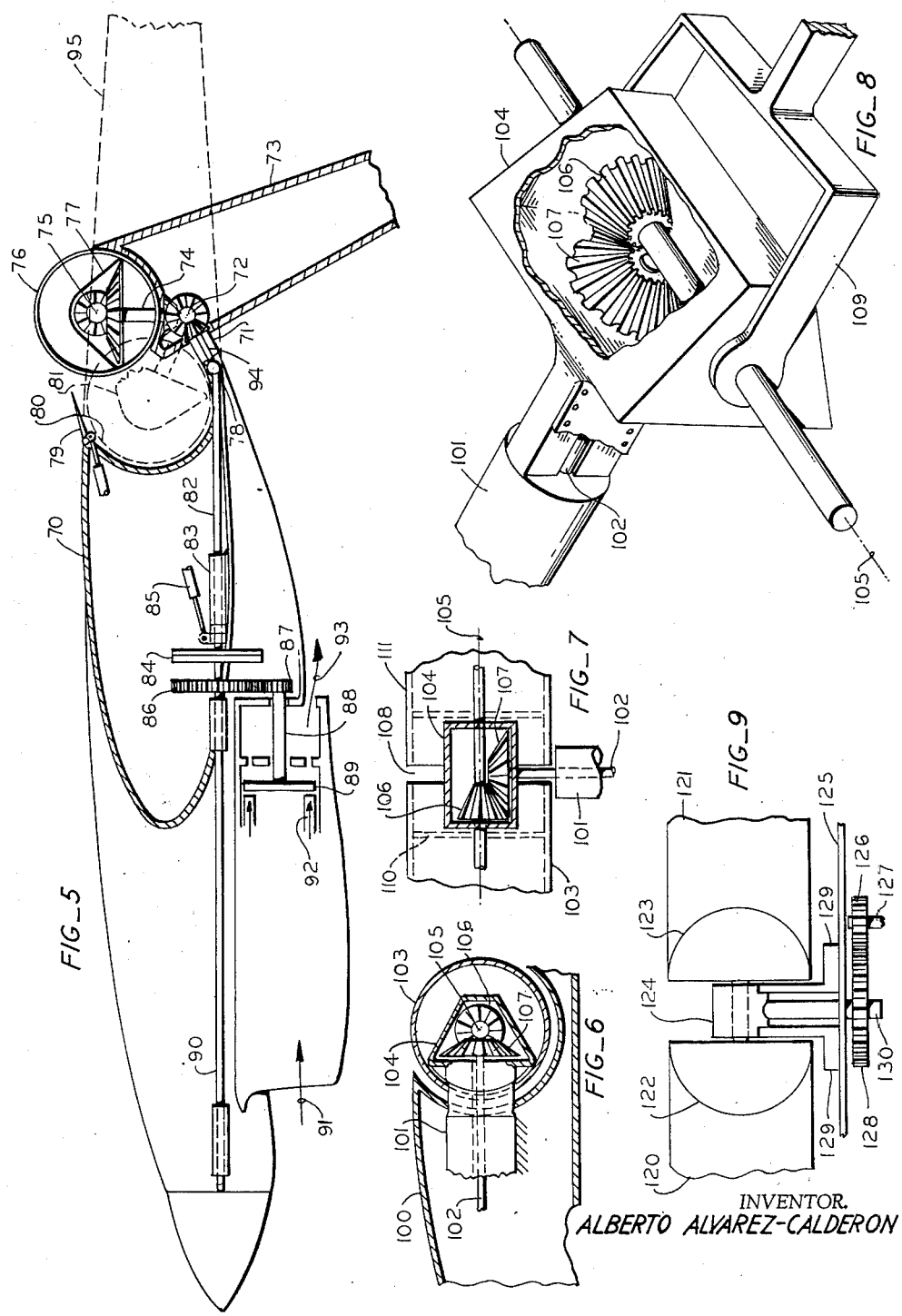

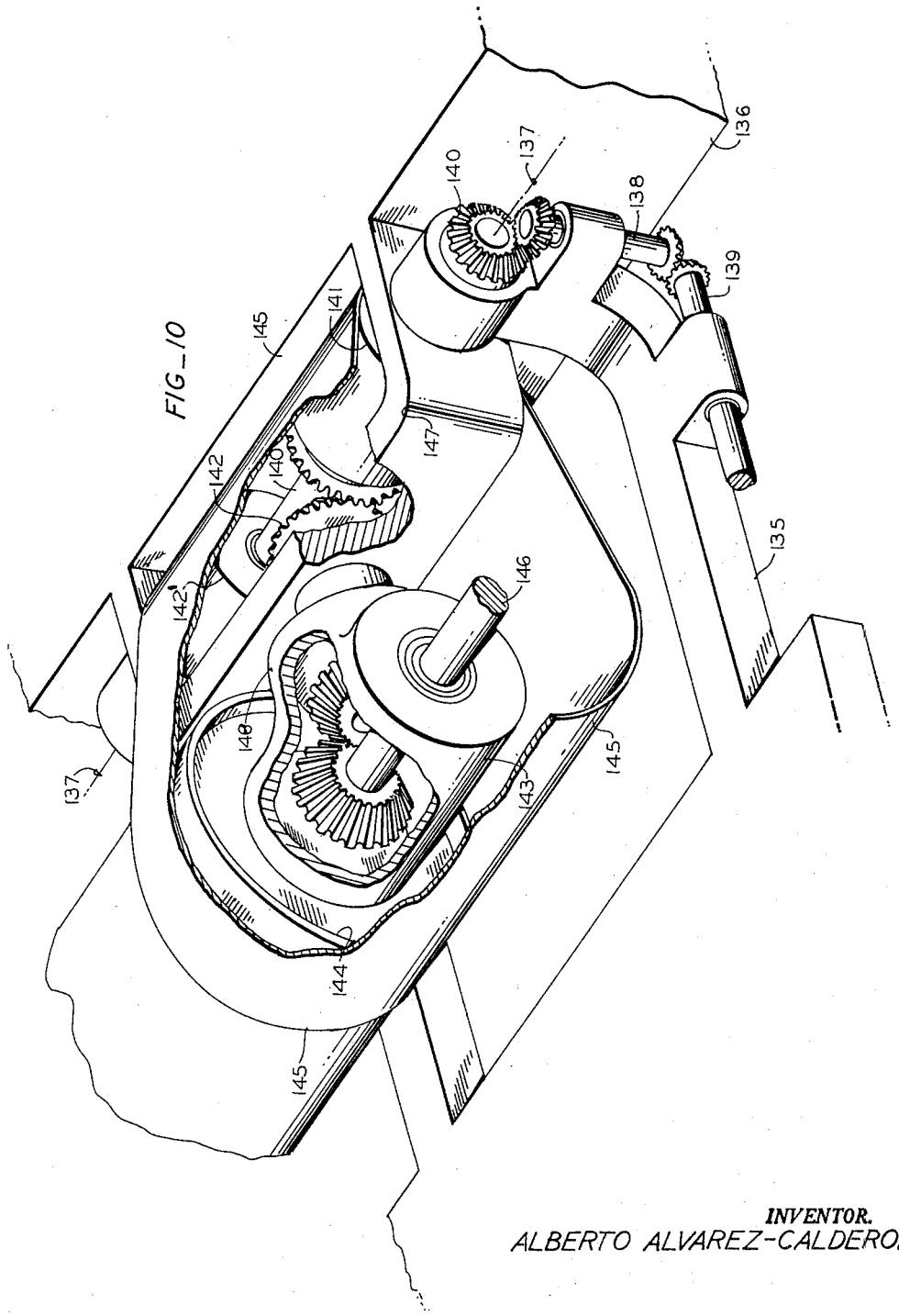

Feb. 18, 1964  A. ALVAREZ-CALDERON  3,121,544
SAFETY AND HIGH LIFT SYSTEM AND APPARATUS FOR AIRCRAFT
Filed Jan. 8, 1962  5 Sheets-Sheet 4
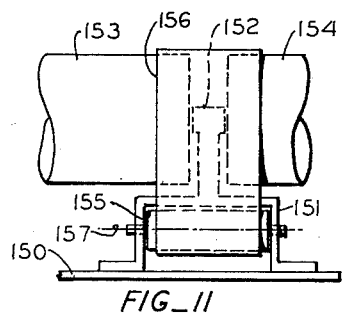
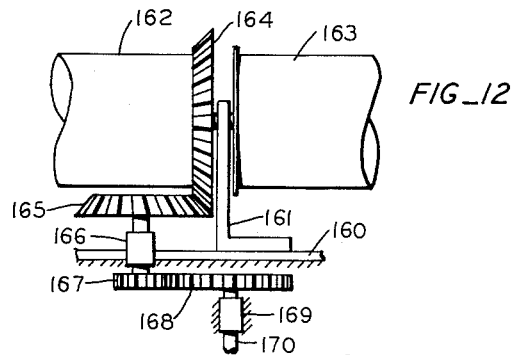
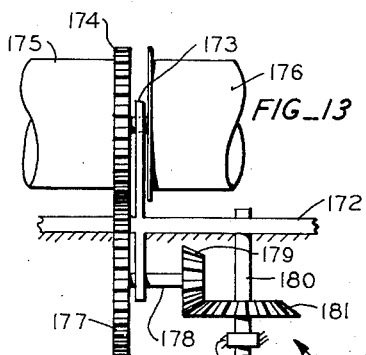
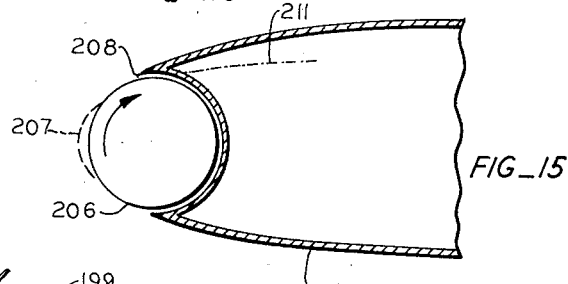
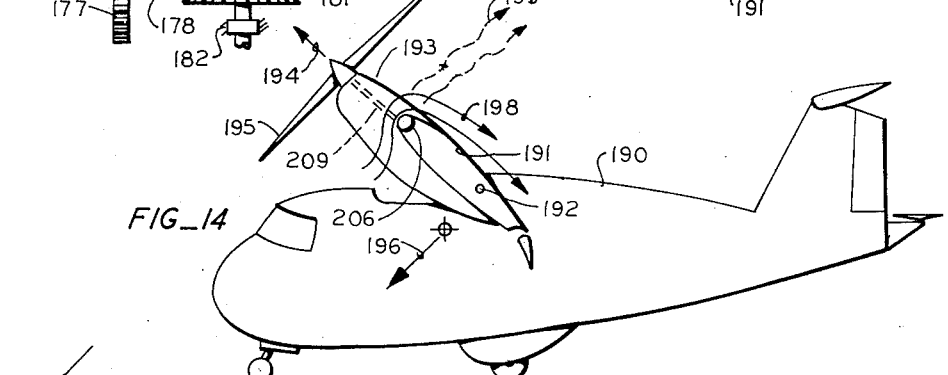
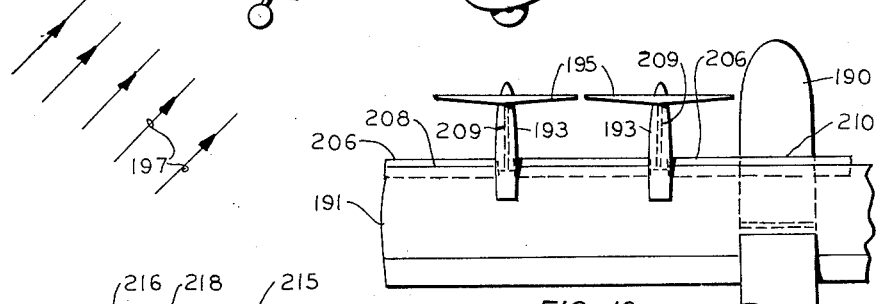
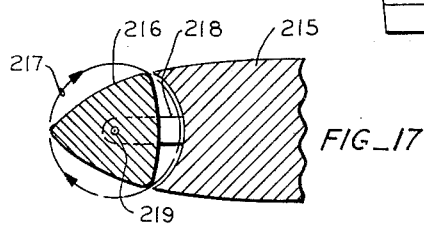
INVENTOR.
ALBERTO ALVAREZ-CALDERON

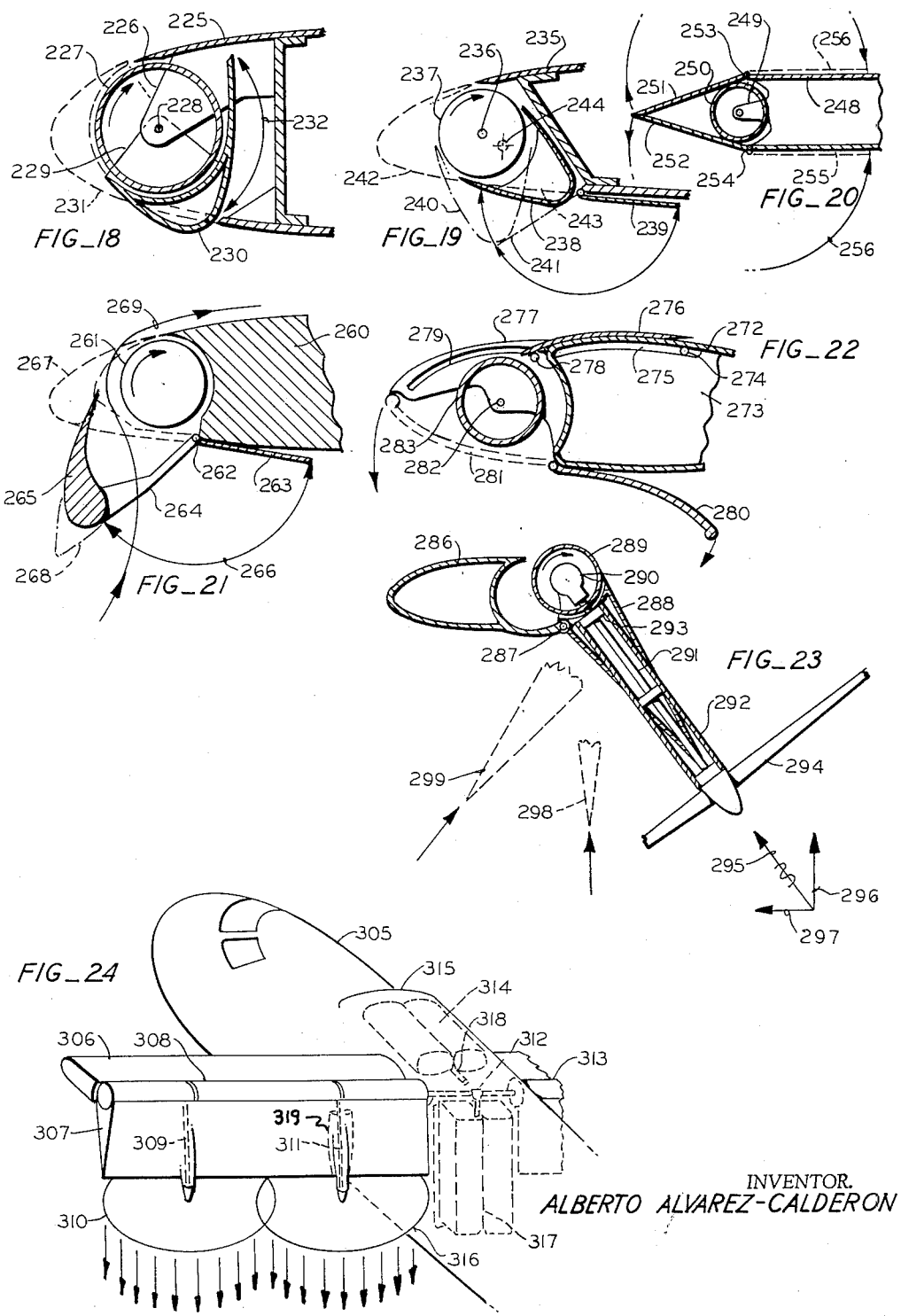

United States Patent Office 3,121,544
Patented Feb. 18, 1964

1

3,121,544
SAFETY AND HIGH LIFT SYSTEM AND APPARATUS FOR AIRCRAFT
Alberto Alvarez-Calderon, Palo Alto, Calif.
(Salaverry 3424, Lima, Peru)
Filed Jan. 3, 1962, Ser. No. 164,849
21 Claims. (Cl. 244—10)

The present invention is related to aerodynamic and structural characteristics of VTOL and STOL aircraft. More specifically, this invention concerns the use of spanwise rotating cylinders to serve both as a high lift device on a wing and as a mechanism to interconnect the propulsive elements of the aircraft. This application is a continuation in parts of my copending application Serial 48,038 filed on August 8, 1960.

In my aforementioned copending application, I have described some of the problems encountered in the operation of VTOL and STOL aircraft. I have shown therein how the use of rotation cylinders in combination with flaps and wings can serve to improve the lift of standard wings, and how certain peculiar arrangements in which the cylinder is displaced upward when its flap is deflected, results in improved flap characteristics and in superior VTOL and STOL performance of aircraft. I have shown the unique advantages that these peculiar arrangements have to provide large flow turning angles, high lift efficiency, greatly improved pitch stability, and aerodynamically balanced flaps. Further, I have disclosed in that application that singular advantages are obtained by using the rotating cylinders not only for high lift but also as a mechanical device to interconnect the powerplants and propellers of an aircraft such as to provide symmetric thrust in the case of unsymmetric powerplant failure.

It is desirable that regardless of the high lift system used in a VTOL or STOL aircraft, the thrust and lift producing devices like turbines, propellers or fans be connected to each other such that in the case of unsymmetric powerplant failure, the lift and thrust forces remain symmetrical in the aircraft. This is a critical importance in slow speed and stationary flight, since in this regime, uncontrollable motions of the craft would result in case of powerplant failures without this feature of interconnection and symmetry of loads. VTOL and STOL aircraft therefore used mechanical interconnection between their fans or propellers. For example, the Breguet 940 and 941 STOL aircraft has spanwise shafts completely inside its wings, connecting their propellers as a safety device for its slow speed operation. (Aviation Week, June 12, 1961, page 107.)

In my aforementioned application, I disclosed rotating cylinders mounted on the wing and rotating cylinders mounted on the leading edge of flaps with the flaps pivoted to the wings by flap pivotal axis to the rear of the cylinder axis. I disclosed the use of such cylinders with a slot ahead of the cylinders between the wing and the cylinders, and without such a slot and showed several spanwise door and spoiler arrangements used to permit movement of cylinders with respect to the wing and/or to provide a spanwise high lift slot.

In this application I am showing in greater detail the mechanical aspects of the high lift structures disclosed in my aforementioned application, especially in relation to their use as interconnecting shafts for propellers. I am also showing various additional arrangements and mechanisms particularly suitable for high lift rotating cylinders which are mounted on wings or flaps and which serve as a mechanism to interconnect powerplants and propellers or fans.

It is one purpose of my invention to provide a unique high lift system for aircraft wings which not only serves

2 to improve the lifting capacity of an aircraft but also serves to provide essential safety of operation for the case of unsymmetric powerplant failure at slow speed or stationary flight.

It is a more specific object of my invention to provide spanwise high lift rotors on a wing—which rotors not only act as a high lift device—but serve in unique cooperation with the aircraft's performance requisites of controllability and safety by acting as a safety device which interconnects the propellers or fans of the aircraft to provide symmetric thrusts in the case of unsymmetric powerplant failure.

Yet another object of my invention is to provide apparatus for the use of such rotors mounted on the leading edge of the flaps which flaps are connected to the wing by a flap pivotal axis outside of the axis of the rotor.

Another object of this invention is to provide certain shafting and connecting elements useful for a multipropeller VTOL and STOL aircraft using a high lift rotor to interconnect its propellers. An additional object of the invention is to provide shafting to transmit power from a powerplant to a remote fan or propeller, which shafting also serves to improve the aerodynamic characteristics of a wing.

One more object of this invention is to provide an unique mechanism which, without aerodynamic penalties, closes the gap between adjacent ends of rotating cylinders whose ends are separated by a cylinder bearing support.

Yet another object of this invention is to decrease the disc loading of a multiengine aircraft in case of powerplant failure, whereby lifting efficiency of the remaining powerplants is increased. One more object of this invention is to provide for a high lift system the net power required of which is substantially lower than that of other boundary layer control systems.

These and other objects and features of my invention will become evident from a perusal of the following description of the various embodiments illustrated in the accompanying drawings wherein:

FIGURE 1 is a perspective fragmentary view of a propeller-driven aircraft using my spanwise rotating cylinder for both high lift and propeller shaft interconnection.

FIGURE 2 is another perspective fragmentary view showing a ducted or shrouded propeller aircraft using my spanwise rotating cylinder as a propeller-driving and interconnecting shaft, as well as a high lift device on the aircraft wing.

FIGURE 3 shows a shaft transmission mechanism to connect propeller shafts by means of a rotor mounted on the leading edge of a flap and with the flap pivotally connected to the rear of the rotor's axis.

FIGURE 4 shows an alternate mechanism to that shown in FIGURE 3.

FIGURE 5 shows a nacelle installation for a multipropeller aircraft, of a gas turbine powerplant having a free turbine mechanically connected to a propeller shaft and to my high lift and propeller-interconnecting rotating cylinder.

FIGURE 6 shows from the side a cylinder support bracket which includes a gear-box internal to the cylinder.

FIGURE 7 shows a top view of the structure of FIGURE 6.

FIGURE 8 shows in perspective and from a quarter-rear view some of the details of the structure of FIGURES 6 and 7.

FIGURE 9 shows a bladed type of rotor installed to act as a high lift device and as a propeller interconnecting shaft.

FIGURE 10 shows a perspective view of a gear transmission system for rotors mounted on the leading edge of flaps having flap axis to the rear of the cylinder's axis. This structure is of the type shown on the flap of FIGURE 5 but further characterized in having an auxiliary rotating cylinder to close the necessary gap between the cylinder in the area of the cylinder bracket support.

FIGURE 11 shows a top view of an installation of an auxiliary rotating cylinder of the type shown in FIGURE 10. The auxiliary cylinder serves to close the gap at the cylinder support bracket.

FIGURE 12 shows a partial top view of a cylinder-propeller interconnection in which peripheral bevel gears are used on the cylinder and spur reduction gears are shown outside the cylinder.

FIGURE 13 shows a partial top view of a cylinder-propeller interconnection in which spur or helical gears are used on the cylinder and a bevel gear reduction system external to the cylinder is used for the propeller shaft.

FIGURE 14 shows a side view of a tilt wing airplane in steep descent, with its wing having a propeller interconnecting shaft which also serves as a high lift leading edge device on the wing.

FIGURE 15 shows a partial cross-section of the leading edge cylinder of FIGURE 14.

FIGURE 16 shows a partial top view of the wing and shafting of the aircraft shown in FIGURE 14.

FIGURE 17 shows a profile of an alternate leading edge rotor for a high speed wing.

FIGURE 18 shows a leading edge rotor with an ingenious pivoted leading edge high speed fairing.

FIGURE 19 shows an improved leading edge fairing for a leading edge rotor on a thin wing.

FIGURE 20 shows a wedge shape leading edge fairing for a leading edge rotor on a supersonic wing.

FIGURE 21 shows a high speed leading edge fairing that acts as a slat for a leading edge rotor on a wing.

FIGURE 22 shows an alternate leading edge fairing for a rotor.

FIGURE 23 shows in cross-sectional view the use of my propeller interconnecting rotor on a flap having flap-mounted propellers.

FIGURE 24 shows a partial perspective view of an airplane incorporating a structure of the type of FIGURE 23.

With initial reference to FIGURE 1, I show therein a particularly advantageous use of the rotating cylinders as a high lift device as well as a mechanical connection between the propellers of an aircraft. As it is illustrated, the left half of wing 1 of the aircraft mounts two propellers 2 and 3 in conventional fashion to its forward or leading edge. The propeller shafts 4 and 5 are extended rearwardly through the wing and are suitably mechanically interconnected by traverse shaft 6 which functions as a high lift device in combination with flap 7 and lift-augmenting aileron 8. Also shown are additional spoiler-type ailerons 9 which may be of conventional design.

The shaft or rotating cylinder 6 may be extended through the fuselage (shown in dashed lines) for interconnection of the propeller shafts of the right hand wing (not shown) in the same fashion. Thus the cylinder 6 serves both as a high lift and/or control arrangement and also fulfills the propeller interconnecting function which is an absolute requisite to safety in the event of powerplant failure of a VTOL or STOL aircraft. Since safety reasons require such an interconnecting shaft there is no added penalty through utilization of the interconnecting shaft 6 as a high lift cylinder for flow deflection. The weight, mechanical complexity, and cost of the high lift system are greatly reduced in view that the mechanical devices of the high lift system itself are necessary anyway for essential safety considerations of propeller interconnection for slow speed or vertical flight. It should be observed that in FIGURE 1, either two separate powerplants may be used to drive propellers 2 and 3, or a single powerplant located at the nacelle of propeller 3 may be used to drive both propellers in which case the disc loading of the aircraft may be reduced. Yet with one powerplant at each side of the fuselage and connected to each other, the failure of one engine does not produce asymmetry of propeller loads or total loss of lift. The general arrangement shown in FIGURE 1 is illustrative of rotating cylinders mounted on the wing or on the leading edge of the flaps. In the former case, with the rotating cylinders mounted on the wing, obviously all that is necessary to connect cylinder 6 to propeller shafts 4 and 5 is a simple gear arrangement such as bevel gears. This type of gear connection is simple and known in the art. For instance in FIGURE 1 of U.S. Patent 2,749,059, there is shown chordwise propeller shafts connected by a gear box to a spanwise shaft which shaft is completely inside a wing. A similar gear arrangement could obviously by used for a wing-mounted for spanwise high lift cylinders which cylinder is in contact with wing airflow in the high lift position as installed in the arrangement of FIGURE 1. For the case of an overall cylinder arrangement like that of FIGURE 1 but with the rotors mounted on the flap's leading edge and the flap pivoted at an axis not coincident with the rotor's axis, then auxiliary shafting may be introduced from the chordwise propeller shaft to the spanwise rotor. Such auxiliary shafting may be an additional bevel gear at the flap's pivotal axis. Examples of such shafting and other types of connections will be shown and described in reference to subsequent figures. However, before entering into this detailed description, it is convenient to point out another installation, similar to that of FIGURE 1, of a high lift rotor used for power transmission and propeller interconnection of a ducted propeller vehicle. In FIGURE 2 therefore, I show the use of a spanwise high lift cylinder with a flap installed in the left portion of a VTOL ducted propeller airplane. There is shown a central fuselage 12 having fixed wing 11, flap 14, and a high lift spanwise rotating cylinder or rotor 14. At the tip portion of wing 11, there is shown tilting duct 15 having tilting ducted propeller 16. The powerplants of this vehicle may be located at the duct in which case the rotor 13 acts as an interconnection shaft for symmetrical lift in case of unsymmetric powerplant failure. Otherwise, the powerplants may be mounted in the aircraft away from the duct, in which case rotor 13 serves for continuous power transmittal and also as a safety feature.

It is not the purpose of this invention to show how to construct the known types of tilting ducted propeller vehicles which have spanwise interconnecting shafts in their wings. Such structures have been built and are known in the art; see, for instance, U.S. Patent 2,780,424 of February 5, 1957 in which tilting ducts are interconnected by spanwise shafts internal in the wing. It is evident then that in my tilting duct and wing structure of FIGURE 2, the gear connections and shafting elements can be readily constructed using mechanisms known in the art. In my structure, however, the spanwise rotating shafts or cylinders should have their surfaces in contact with the airflow around the wing when the flaps are in the high lift position.

The use of such spanwise shafts on the wings of the ducted propeller vehicle would greatly improve the STOL performance and transition characteristics of the craft, since high lift coefficients and attached flows would become available for the wing.

In FIGURE 3 I show a cross-sectional view of a wing having a high lift slotted flap with a propeller-interconnecting rotating cylinder mounted on the leading edge of the flap and with chordwise transmission shaft between the spanwise rotating cylinder and a chordwise propeller axis fixed in the leading edge of the wing. Specifically there is shown wing 21 having at its rear portion flap bracket 22 which supports flap 24 at flap pivotal axis 23. Flap 24 is shown deflected and supporting on its flap leading edge a spanwise rotating cylinder 28. The cylinder supports on the flap are omitted in the drawing. The wing is shown supporting propeller axis 33 by means of bearing 35 and bracket 34. As can be seen by inspection of the kinematics of the flap, the cylinder is displaced with respect to the wing when the flap is deflected. In order to provide propeller interconnection by means of the flap-mounted rotating cylinder, it is necessary to have then a suitable transmission system between the fixed chordwise propeller shaft and the translating cylinder mounted on the flap. This transmission is provided as follows: At the end of fixed shaft 33 there is flexible shaft joint 36 which may be a conventional universal joint or a bevel gear. Joint 36 is used to connect inclined shaft 37 to shaft 33. Shaft 37 is axially extensible itself by means of concentric shaft 38 which tapers down to smaller diameter 39 and engages the cylinder at bevel gears 40 and 41. Shafts 37 and 38 may be mated wtih axial grooves which prevent relative shaft rotation.

Evidently, relative axial motion between shafts 38 and 37 and angular motion between shafts 37 and 36 allows the displacement of the cylinder with respect to the wing but yet permits power transmittal and propeller interconnection by means of the rotating cylinder.

In the drawings, there is also shown other details of the wing construction. The forward edge of the lower surface of the flap is seen provided with spanwise door 26 which serves to form a wing slot in the flap deflected position wherein gases can flow from below the wing by path 31 and outward by path 43 on top of the cylinder. The door also serves to close the slot by suitable action by piston 3 such as to move the door to position 27 where the flap is retracted to flap position 25. In the flap retracted position, the cylinder falls in position 30 within the contour of the wing, and a small door 29 is projected from within wing 21 to smoothly close any gap between the wing's upper surface and the upper forward surface of the flap. The door 29 is shown retracted in the drawing.

FIGURE 4 is an alternate structure to that of FIGURE 3 and is characterized in that the flexible propeller-interconnecting transmission system serves also as a flap actuator to deflect the flap. For clarity, the wing contour has been omitted completely. FIGURE 3 shows fixed wing frame portion 50 which is the fixed or main portion of wing mounting a pivoted flap the forward portion of which is represented by pivoted arm 61. Arm 61 supports a spanwise rotating cylinder 60 having a cylinder axis 65 which can translate along arc 64. The fixed wing frame 50 also supports propeller shaft 55 at bearing 56, actuating piston 54, and has rails for wheels 52 (rails not shown). Shaft 55 rotates axially, and is connected axially with co-rotating concentric external shaft 51. Shaft 51 is constrained to travel axially by means of bearings 66 and wheels 52 which serves as a carriage for sliding motion in the axial direction along rails supported on wing 50 (rails not shown). The relative axial displacement of shaft 51 with respect to shaft 55, which should be preferably arranged with mating grooves in the axial direction at the adjacent surfaces of the shafts, is controlled by pushrod 53 and actuated by piston 54.

At the right side end of shaft 51 there is shown a flexible shaft joint 57, which serves to connect inclined shaft 59 to shaft 51. Shaft 59 finally completes the connection between propeller shaft 55 and rotating cylinder 60 by means of bevel gears 62 and 63. Obviously, displacement of pushrod 53 to the right along arrow 67 will result in flap deflection along arc 64. Thus, with this transmission system, the flap leading edge rotor installation serves for high lift, for propeller interconnection, and as a mechanical device to actuate the flap's position.

FIGURE 5 shows a nacelle installation on a wing having a rotating cylinder mounted on the leading edge of a flap which cylinder acts as a spanwise interconnecting shaft between other propellers. These propellers which are not shown in this figure, would be located relative to each other generally as shown in FIGURE 1. Specifically, in FIGURE 5, I show a wing 70 having fixed flap bracket 71 supporting a pivoted flap at flap spanwise axis 72. The wing also suports a fixed chordwise propeller drive shaft 82 at bearing support 83. The rear end of shaft 82 is shown connected to a gearbox or universal shaft joint 73 and the drive shaft is then continued along the fixed flap bracket as shown by shaft 94. Shaft 94 enters the gear box which serves to transmit shaft torque from the wing to the flap and has one gear axis coincident with the flap's pivotal axis, and emerges from the gear box as shaft 74 which goes into the cylinder. Evidently, flap 73 can pivot about axis 72 with the drive shafts operative. Shaft 74 enters into cylinder 76 at the leading edge of the flap, and is connected with the cylinder by bevel gear box 77. Rotation of cylinder 76 about its axis 75 evidently turns propeller drive shaft 83 by means of the previously described system of shafts and gears. To retract the flap, it is pivoted about flap axis 72 to position 95 wherein the cylinder is in position 80 inside the contour of the wing, and cylinder bevel gear box is in position 81. Observe that the flap does not pivot about 73. Evidently the arrangement shown permits the location of the fixed flap axis at any suitable location in the wing contour profile. For instance, bracket 71 could extend upwards toward the upper surface of the wing and then the location of the flap hinge axis could be at approximately the camber line of the wing, or higher. Also, it should be observed that shaft 82 has been shown passing below the cylinder's lower surface in the cylinder-retracted position. Actually, shaft 82 could be located higher than shown if the shaft is located at the same spanwise location as that of the cylinder gap necessary to permit entrance of shaft 74 into gear box 77. In that alternate arrangement in the flap retracted position, the shaft 82 which would have been displaced upward would fall inside the cylinder gap.

Some additional details are shown in FIGURE 5. There is shown on the upper surface of the wing a cylinder door 79 which allows emergence of the cylinder from within the contour of the wing, and may also act as a spoiler if deflected upward by large angles. This will produce a flow deterioration as the door will create a large turbulence ahead of the cylinder which prevents smooth flow around the cylinder and flap. Also shown are further details of the propeller transmission and interconnection system. Evidently, the function of propeller interconnection is essential for VTOL and STOL operation only, and not for high speed flight. In high speed flight, asymmetric powerplant failure can be overcome by conventional aerodynamic controls because the relative airspeed and control effectiveness are large. Thus, it may be desirable to avoid fatigue and lubrication problems, to disengage the propeller interconnecting system for high speed flight, and for this purpose I have shown on my FIGURE 5 a clutch 84 at the forward end of shaft 82. Disengaging clutch 84 evidently disconnects the rotor interconnection system from the powerplant and propeller. Clutch 84 may be of the general type used in automobiles, and may be actuated by piston-type device 85. To the front of clutch 84 there is shown a propeller 90 having a peripheral gear 86 which is driven by turbine gear 87. Gear 27 is driven through shaft 88 by free turbine 89 of a gas turbine installed in the nacelle. The gas turbine is shown schematically having air intake 91, discharging high energy gas 92 into turbine 89 and having an exhaust at 93. In an installation such as that of FIGURE 3, the exhaust could have been directed upwards through a slot if desired.

In FIGURES 6, 7, and 8, I show a generalized case of a rotating cylinder-propeller interconnection support which may be used to support a cylinder from a flap or a wing. This support has been designed to be very thin such as to permit a narrow gap between the adjacent end of the cylinder near the cylinder bracket support. FIGURE 6 shows a side cross-sectional view of a supporting wing member 100 having a drive shaft 102 supported by bracket 101 which bracket enters within the contour of cylinder 103 and supports box 104. Gear box 104 has bevel gear 107 concentric with shaft 102 and bevel gear 106 concentric with cylinder axis 105. As can be seen in the next figure, this arrangement permits a narrow deep bracket-shaft connection between the cylinder and the wing's supporting element. FIGURE 7 shows therefore a top view of FIGURE 6. Specifically, bracket support 101 housing shaft 102 is shown to be of a large cross-section up to the adjacent cylinder surface. At this location bracket support 101 narrows to approximately the same width of the propeller shaft and enters within cylinder gap 108 and into gear box 104. It is seen in the figure how box 104 falls within the cylinder's surface and how the adjacent cylinder ends projects from their bullheads 110 and 111 towards each other to form narrow gap 108. Both figures 6 and 7 can be interpreted with greater clarity with aid of FIGURE 8 which shows a perspective quarter rear view of the structure previously described. The figure is considered self explanatory in light of the previous remarks on FIGURES 6 and 7. One addition has been made, however, and this is bracket 109. Bracket 109 is inside the cylinder and may serve to connect a depended wing surface like a flap to the supporting wing component to which bracket 101 is attached. For instance if bracket 101 is attached to the wing leading edge, then bracket 101 can be used to support a flap.

In my aforementioned patent application Serial 48,038, I described the use of propeller interconnecting high lift rotors which were not necessarily restricted to circular cylinders. I therefore show in FIGURE 9 the use of a flat rotor of the type described in U.S. Patent 2,973,167, of Feb. 28, 1961, modified to act as a propeller interconnecting device. I show in the figure wing spar 125 having two rotor support brackets 129 which support rotor bevel gear box 124 (gears not shown). Gear box 124 is shown having a propeller drive shaft 130 with a peripheral reduction gear 128 which is connected to smaller gear 126 and propeller drive shaft 127. Although not shown in this figure, propeller drive shaft 127 would then continue to the propeller hub like shaft 82 or 90 of my FIGURE 5. In my FIGURE 9, I also show rotor gear box 124 supporting rotor elements 120 and 121 with their respective foldable tip discs 122 and 123. These rotor elements 120 and 121 act to interconnect the propeller shafts in the overall arrangement described in connection with the rotors of FIGURES 1 and 2.

FIGURE 10 shows an ingenious arrangement of shafts, gears, and flexible auxiliary cylinders which serve to provide a propeller interconnection system for rotors mounted on the leading edge of a flap and to provide a cylinder support system in which there is effectively no cylinder gap. Specifically, there is shown a flap supporting bracket 135 which may be attached to a wing (wing not shown) supporting flap spar 136 at fixed flap pivotal axis 137. The flap in turn has cylinder support bracket 147 which supports cylinder axis 146 by means of arm and gear box 148. The structure is provided with a gear and shaft connection that permits interconnection of chordwise propeller shafts with the flap-mounted spanwise rotor. There is shown chordwise shaft 139 which follows bracket 135 by a bevel gear into shaft position 138 and again by a bevel gear into spanwise shaft 140. Shaft 140 is shown connected by bevel gear 142 to cylinder gear box 148 and thence through the latter to cylinder shaft 146. Since shaft 140 is concentric with flap axis 137, flap movement will not prevent smooth interconnection of spanwise cylinder shaft 146 with chordwise propeller shaft 139. It should be observed carefully that bevel gear 142 and gear box 148 could be substituted if desired by peripheral gears between cylinder 144 and shaft 140.

In FIGURE 10 there is also shown an additional feature of the invention: Flexible auxiliary rotating cylinder 145 which is used to cover the flap gear assembly, thus providing a smooth continuous external rotating surface between the adjacent ends of the circular rotating cylinders. (Right side end has been omitted for clarity.) Auxiliary flexible rotating cylinder 145 is shown to be of a non-circular cross-section and extending between rotating cylinder 144 (and its continuation to the right side of gear box 148, which cylinder continuation has been omitted for clarity), and rollers 142′ and 141 on shaft 140. If desired flexible cylinder 145 can be made to carry torque between the rotating cylinder 144 and shaft 140. The auxiliary rotating surface 145 permits the aerodynamic advantages of a smooth uninterrupted rotating cylinder at the flap leading edge but yet permits a large gap between the adjacent ends of the circular cylinders at their cylinder support bracket, to permit a sturdy and efficient structural connection. This type of auxiliary rotating surface is again illustrated in FIGURE 11.

FIGURE 11 shows from a top view a wing or flap spar 150 having a cylinder support bracket 151 and cylinder bearings 152 supporting a pair of spanwise rotating cylinders 153 and 154 with adjacent ends separated by the support bracket. The cylinder support bracket holds also an auxiliary spanwise roller 155 with axis of roll 157. A flexible surface which may be thin metal, plastic, or fabric, is located embracing the cylinders and the roller in the manner suggested in FIGURE 10, whereby the gap between the adjacent ends of the cylinder next to the cylinder support bracket is covered and there is no effective discontinuing of the rotating surfaces. The aerodynamic disadvantages of the gap are overcome by this elegant solution which permits a sturdy and efficient cylinder support. Such an auxiliary rotating surface would be extremely useful in a swept wing airplane, as then the effects of the cylinder gap would tend to propagate in a spanwise direction if the gap is not closed.

FIGURE 12 shows a top view of a very simple arrangement to use spanwise high lift rotors for interconnection of chordwise propeller shafts. There is shown in schematic form a wing or flap spar 160 having a cylinder support bracket 161 and supporting spanwise cylinders 162 and 163. The cylinders are connected by a common shaft at their bearing support. Cylinder 162 is shown with an external peripheral bevel gear 164 connected to bevel gear 165, which may be in turn supported by bearing 166 to spar 160. In addition there is shown spur gear reduction 167 to 168 from which emerges chordwise propeller shaft 170 supported by bearing 169. It is seen then that rotation of propeller shaft 170 is interconnected to rotation of cylinders 162 and 163; if each propeller shaft is installed as suggested in this figure and in FIGURE 1, then the entire propeller system will be safely interconnected.

FIGURE 13 is similar to FIGURE 12. There is shown wing or flap spar 172 having a cylinder support bracket 173 which supports two spanwise rotating cylinders 175 and 176 which are connected to each other. Cylinder 175 is shown provided with a peripheral spur gear 174 which in this case has been shown to be a large gear but could be smaller than the cylinder's diameter. Spur gear 174 is shown in mesh with spur gear 177 which drives shaft 178 to reduction bevel gear box having bevel gear 179 and, on chordwise propeller shaft 180, bevel bear 181. Propeller shaft 180 is shown supported by bearing 182.

So far I have described the use of spanwise high lift rotors interconnecting propeller or shafts of multiengine aircraft, with the rotors mounted on the wing or flaps such as to have the rotor's surface exposed to the relative airstream for high lift. In the following figures, I describe one more embodiment of the invention in which the propeller-interconnection high lift rotor is placed at the wing's leading edge. This embodiment is singularly applicable to a tilting wing VTOL and STOL aircraft, as will be explained with aid of FIGURE 14. It is known that one of the critical maneuvers of a tilt wing VTOL aircraft is that of steep descent with the fuselage in a horizontal attitude. This criticality occurs because the path of the aircraft shown by arrow 196 in relation to the angle of incidence of its tilted wing 191 results in an extremely large effective wing angle of attack with reference to its remote relative airspeed shown by 197, which large angle of attack normally produces severe stall or flow breakdown on the wing. This flow condition is shown by arrows 199. It would be possibe to correct this stalled flow condition by applying a strong propeller slipstream to bend the flow around the wing, but the production of such slipstream would also result in the presence of a large thrust 194 which would also have a large forward or horizontal component which naturally would accelerate the aircraft in the horizontal direction, thereby changing the angle of steep approach into a shallow approach angle which is not desirable for VTOL or STOL operation. Restating the problem, in order to avoid severe wing stall and turbulence in a steep approach, the tilt wing vehicle normally would use the propeller slipstream to bend the flow around the wing. However, such slipstream would be accompanied by a production of thrust the horizontal component of which would accelerate the airplane in a horizontal direction thereby changing the angle of approach. This is undesirable. These adverse flow conditions also occur in other transition maneuvers.

Now a normal high lift device such as a slat or drooped nose may be effective for wing angles of attack of up to 20 degrees but beyond that, stall results. It is seen in the drawing that the effective wing angle of attack in a steep approach may be much larger than 20 degrees; hence, a more powerful leading edge device is needed. One such device is a rotating cylinder at the leading edge of a wing. The mechanical complexities of that system are large compared to say a leading edge slat. However, the mechanical complexities of the cylinder become small as a high lift device per se if it is realized that such a spanwise rotating shaft is needed anyway for propeller shaft interconnection. Hence, the use of the rotating device becomes very desirable as its mechanical complication, weight, power required, etc., would be present anyway in the system.

Having explained the aerodynamic problem of the steep approach tilt wing and the singular co-operation of the leading edge cylinder for this type of craft, I now complete the description of FIGURE 14. There is shown in a side view a fuselage 190 mounting a tilt wing 191 by wing tilt axis 192. The wing is shown supporting a powerplant nacelle 193 with a propeller 195 and a chordwise propeller shaft 209. Shaft 209 is suitably interconnected to wing-mounted spanwise leading edge rotor 206 by means of a suitable gear connection like a bevel gear. Since the connection may be made inside the nacelle without any cylinder gap problems, its installation is extremely simple and a conventional gear box may be used, or an arrangement of the type shown in FIGURES 8, 12, or others.

The aircraft's path is shown by arrow 196, its remote relative airspeed by arrow 197, a stalled wing flow by arrow 199, and the flow improvement due to cylinder rotation is shown by arrow 198. With the improved flow conditions, it now becomes possible to control the angle and rate of descent of the craft including very steep VTOL and STOL approaches, which enable the pilot to land the craft in the intended area.

An alternate solution for the control of the steep approach of VTOL and STOL craft would be to use a tilt wing or tilt duct capable of tilting to negative angles with respect to the fuselage and then for a steep approach with a generally horizontal fuselage, tilt the wing or duct at a negative angle such that it is generally parallel to the aircraft's path direction, and then apply reverse thrust to the propellers to control both the sink rate and the angle of descent.

FIGURE 15 shows in greater detail the cross-sectional shape of the wing with a leading edge high lift spanwise rotor shown in FIGURE 14. Specifically, in FIGURE 15, I show the forward 30 percent of wing 191 having a cross-section similar to the NACA 23018 but modified with a leading edge cylinder 206. The upper fixed wing is shown as 208. For comparison, the NACA 23018 leading edge shape is shown in dash lines 207, and a different alternate wing upper surface is shown in dash dot lines 211.

In FIGURE 16, I show a partial top view of the structures shown in FIGURES 14 and 15. Specifically, I show therein a fuselage 190 having a tilting wing 191 (left wing shown) in which are mounted two nacelles 193 and two propellers 195. The propellers are interconnected to each other by chordwise propeller shafts 193 and spanwise leading edge rotor 206. Rotor 206 extends along the wing leading edge across the fuselage section 210 and into the right wing (right wing not shown) wherein its connects to the right wing propellers. It should be noticed that such an installation is very advantageous as it prevents wing stall in the center portion of the wing where there is no slipstream to improve the flow. This improvement also results in a more effective tail surface since the flow arriving there has a higher dynamic pressure with the improved flow conditions on the wing. It is also possible to extend wings beyond the slipstream of the outboard propellers with a greatly improved flow due to the cylinders during transition maneuvers and slow speed flight.

FIGURE 17 shows an ingenious cross-section for a wing leading edge rotor which permits the use of a high speed wing profile together with the high lift advantages of the rotor. Specifically, there is shown the forward portion of a high speed wing section having a wing portion 215 with a forwardly extending bracket 218 which supports a non-circular but generally triangular type of leading edge rotor 216 at rotor axis 219. Observe that in this arrangement, the rotor is symmetrically disposed about its rotor axis to simplify dynamic problems of rotation of the rotor. Yet a sharp leading edge suitable for high speed flight is possible for the wing. When the rotor is turning, its apexes describe a circular path 217. Such triangular rotors are advantageous even in conventional high speed airplanes.

As already mentioned the wing leading edge rotors are singularly applicable to tilt wing aircraft if the rotor is used for propeller interconnection. The particular aerodynamic advantages of the device for tilting wing airplanes can be estimated from the data available in NACA Technical Memoranda No. 354 of 1926, in which there is shown section lift coefficients of the order of 2.2 (based on dynamic pressure as one half of the product of the air density times the square of the tunnel speed) for an angle of attack range of 20 to 40 degrees. It is seen that the lift characteristics of the rotor are about the same as that of a leading edge flap (see, for instance, NACA WRL 269); the angle of attack range for high lifts is, however, approximately twice as large as a slat. On a conventional fixed wing airplane leading edge rotors are impractical because of the mechanical complexity and high-speed penalties of the rotor and because the aircraft would have to be tilted by 40 degrees to realize the full potential of the device.

On a tilt wing airplane, however, the mechanical complexity of the shaft exists anyway, and it is precisely a desired characteristic to have a large angle of attack range with useful lift and principally with attached flow. The rotor as proposed in this embodiment of the invention then acts in singular cooperation with the demands of the craft.

The high speed aerodynamic characteristics of the leading edge rotor as proposed in the past and as shown in FIGURE 15 are not favourable for high speeds, and large drags result from the cylinder gaps and its large crossection; near the speed of sound the drag increase would be prohibitive. This difficulty, however, can be overcome by the ingenious structures that I show in FIG- URES 18 to 22, in which the leading edge rotor can be exposed for slow speed flight or tilted wing flight, and can be housed completely within the wing for high speed flight without varying the position of the cylinder with respect to the main portion of the wing.

FIGURE 18 shows the forward portion 225 of an airfoil mounting at its forward part, a leading edge rotor 227 at rotor axis 228 by means of rotor bracket 226. At an axis colinear with 228 there is also mounted bracket 229 which supports a wing leading edge fairing 230 the crossection of which is that of the airfoil's contour leading edge portion; position 230 shows the fairing in the high-lift position exposing the forward surfaces of the rotor to the airstream. This position is used for tilted wing operation. For high speed operation fairing 230 is rotated clockwise about pivot 228 by arc 232 to position 231 shown in dash lines, wherein it forms the leading edge surfaces of wing 225. Observe that the fairing and the wing enclose the rotor completely with a smooth conventional airfoil contour.

FIGURE 19 shows a pivoted rotor fairing similar to that of FIGURE 18 but somewhat more complicated. Specifically, forward wing portion 235 supports a leading edge rotor 236 at axis 236 (rotor bracket not shown). At an axis colinear with 236 there is supported a leading edge fairing 238 shown in a first high lift position; to enable fairing 238 to penetrate inside the wing's contour, a lower surface spanwise door 238 has been provided and is shown open. This position exposes nearly half of the cylinder surface to the airflow.

The fairing and door have a second high lift position shown in dash dot lines and in which the fairing 240 changes the camber of the wing; the spanwise door can then be moved to position 241 if desired.

Finally, there is shown a high speed arrangement in which the fairing is in position 242 and the spanwise door in position 243.

The structure shown permits the use of a large rotor on a relatively thin wing.

An alternate fairing pivot axis is shown as 244; the fairing positions shown do not correspond to this alternate axis, however.

FIGURE 20 shows a leading edge rotor on a wing suitable for supersonic flight. Specifically forward wing portion 248 supports rotor 250 by bracket 249. From the forward upper and lower edges of portion 248 there is pivoted flat spanwise doors 251 and 252 respectively which enclose the rotor for high speed flight and define a wedge leading edge contour. For high lift, doors 251 and 252 are pivoted backwards at hinge axis 253 and 254 respectively, to position 256 and 255 respectively, whereby the rotor is exposed to the air for high lift. Path of lower door is shown by arrow 256.

FIGURE 21 shows a peculiar arrangement in which the rotor leading edge fairing acts also as a high lift slat in unique cooperation with the wing and the rotor. Specifically forward wing portion 260 supports a leading edge rotor 261. At the lower surface of the wing and at its forward edge approximately below the rear surface of the rotor, there is pivoted a bracket 264 which supports a rotor leading edge fairing 265 shown in a high lift and/or tilted wing condition, and a spanwise door 263 shown open to allow passage of air 259 between fairing 265 and rotor 261. Alternately door 263 may be pivoted on bracket 264. The slot between the rotor and the fairing is a contracting one to accelerate the air; in addition, the rotor adds to this effect whereby large flow re-energizing effects result. For the case of tilt wings, this slot is specially advantageous.

The fairing shows an alternate contour for high speed flight shown as dash dot lines 268. For high speed flight, door 263 is pivoted in a clockwise direction along path 266 against fairing 265; and fairing 265 is pivoted to position 267, whereby a high speed contour for the airfoil is produced with a totally enclosed rotor within its surface.

The time sequence of fairing and door closing indicated above is not specified by way of limitation; it is also possible to move the fairing to the high speed position first and then close spanwise door 263, or move both parts simultaneously. To close the pivoted parts, mechanisms shown in other parts of the application can be used, or others known in the art for closing spoilers, etc. It should be observed that the structure of FIGURE 21, even with the rotor stationary would act as an excellent high lift device.

FIGURE 22 shows a wing forward position 272 having a rib 273 and a forward cylinder-supporting bracket 277 with a cylinder 283 supported at axis 282. In the upper surface of the wing there is seen superimposed on it a sliding surface 276 shown in a high lift position and which can slide along tracks 279 and 275 forwardly to define the upper surface of a high speed wing leading edge. On the lower surface of wing 272 there is shown open in high lift rotor-exposing position a door 280 which when pivoted to position 281 defines the lower surface of the wing's leading edge. A sliding lower door could also be used if desired.

The structures of FIGURES 18 to 22 with their improved high speed characteristics, may be used as a leading edge high lift device for fixed wing airplanes having high lift wings of conventional configurations. They become particularly useful for propeller VTOL and STOL airplanes using the high lift rotor for propeller interconnection safety; in such arrangements conventional flaps may be used, or boundary layer control flaps may also be used.

The wing leading edge structures of FIGURES 15, 17 and 18 to 22 become singularly advantageous when used in tilting wing aircraft as propeller interconnecting shaft because of the large angle of attack range possible with attached flows and the peculiar demands of the vehicle.

It should be carefully observed also that the leading edge rotor of FIGURE 17 and rotor fairings of the general type shown in FIGURES 18, 19, 21 and in particular FIGURES 20 and 22 can be adapted on a rotor at the leading edge of a flap for the purpose of exposing the rotor to the airstream for high lift but yet have a smooth closed wing surface for the flap retracted high speed condition.

Additionally, it should be observed that the drawings of FIGURES 15, 18, 19, and 21 have been drawn to correspond to the contours of the NACA 23000 series of airfoil section at a scale of 1 inch equal 10 percent chord, thus the various proportions, shapes and hinge line locations shown are of importance.

With reference to other mechanical aspects of the wing leading edge rotors, obviously the gears and other structures described in earlier figures and in the specifications with respect to wing and flap rotors are also applicable for the structures and connections of my leading edge high lift rotors and the propeller shafts. It should be noticed that if the leading edge rotors are connected to the propeller shafts below a propeller nacelle's surface, then the gear mechanisms as well as the rotor fairing supports can be easily arranged with conventional gear boxes.

Other arrangements for leading edge rotor fairings are spanwise telescoping rotor fairing telescoping from a fuselage or a nacelle outwards towards a wing panel; or fairings pivoted at one end of a wing panel about generally vertical pivotal axis on a fuselage or a nacelle.

In FIGURES 23 and 24 I show additional embodiments of my high lift cylinders acting as propeller interconnecting and driving mechanisms.

In FIGURES 23 and 24 I show the use of pusher propeller's mounted on a flap and connected to my high lift and safety rotor.

Specifically, FIGURE 23 shows a fixed wing 286 supporting a flap 288 at flap pivotal axis 287. The flap is of the aerodynamically balanced type in this figure, and is shown supporting a cylinder 289 at its leading edge. The cylinder serves as a driving shaft to drive propeller shaft 291 by means of reduction gear 290 inside the cylinder. The shaft is supported to fixed flap structural tube 292 by bearings 293, and supports a propeller 294. The propeller thrust force 295 has a direct lift component 296 and a forward component 297.

When the flap is deflected by approximately 90 degrees, the entire propeller thrust acts in a vertical direction consequently, with sufficient power application vertical flight becomes possible. In this condition, the thrust vector should preferably pass through the center of gravity of the aircraft, for which purpose wings using the crossection shown on the figures should be swept forward slightly; alternately, the propeller shaft may be displaced below the flap and parallel to it such that when the flap is deflected 90 degrees, the line of action of the thrust vector acts ahead of the plane of the flap and through the center of gravity of the craft.

Position 299 is shown for steep STOL approaches in which potential and kinetic energy of the craft is dissipated by accelerating air in a direction opposite to that of the thrust vector of position 299 and away from the airplane.

It should be observed that the flap chord of a structure of the type of FIGURE 23 could be of smaller size than shown, for instance, 40 percent of the chord, and that a wing mounted cylinder flap combination could also be employed advantageously.

FIGURE 24 is a perspective partial view of VTOL or STOL airplane using a structure of the type of FIGURE 23.

Specifically, FIGURE 24 shows a fuselage 305 mounting a fixed wing 306. The wing mounts a flap 307 and a cylinder 308 between the flap and the wing. The flap also mounts propellers 310 and 316 which have chordwise propeller drive shafts 309 and 311 suitably connected to spanwise cylinder 308. Cylinder 308 is connected across the fuselage's width to cylinder 313 on the right wing (right wing not shown) and to the interconnection system of the right wing propellers, (not shown).

The propellers may be driven by a pair of gas turbines symmetrically disposed about the fuselage and on the flaps; for instance, turbine 319 on the left wing and a similar installation on the right wing (not shown). Turbine 319 may be inside, above or below the flap. Alternately, a pair of turbines 317 may be mounted vertically inside the fuselage with a common drive shaft to gear box 312 driving the spanwise shaft and cylinders. Another arrangement is shown by pair of turbines 314 having air intake 315 and common drive shaft 318. These turbines should preferably be free turbines and may be connected to the cylinder through the various structures shown earlier in this application.

Yet another arrangement to mount the turbines in FIGURE 24 would be to locate them at the tip portions of the flap. Alternately ducted propellers of the type of FIGURE 2 could be fixed on the flap of FIGURE 24.

It should be observed that both in FIGURE 1 and FIGURE 24, there has been shown aircraft having two propellers on each side of the fuselage, the propeller in each side of the fuselage connected to each other, and each pair connected across the fuselage's width to each other. This is ideal for VTOL and STOL. In certain cases in which it is desired to avoid interrupting the fuselage, special shafting may be provided to transmit shafting on the periphery of the fuselage's crossection, or each pair of connected propellers on the sides of the fuselage may be independent, i.e., not connected across the fuselage. This latter arrangement, while not optimum for VTOL and STOL safety, may be useful for a more conventional wing high lift system having two powerplants on each side of the fuselage because in the case of a single powerplant failure on one side of the fuselage the remaining engine can drive both propellers whereby the loss of slipstream effects are not as serious for that wing. Additionally, there is no drag and adverse yaw due to a feathered propeller; this is important for slow speed yaw stability and control.

Furthermore, since the discloading is decreased for the power available from the single operative engine by connecting it to two propellers, the thrust available for the installed power increases, as is known from rotor theory.

Before closing this specification, it should be mentioned that the wing leading edge rotor fairings shown earlier in this specification can also be used for roll and yaw control of tilt wing aircraft by varying their position with respect to the rotor unsymmetrically about the central fuselage, thereby causing an unsymmetric wing load.

Various further modifications and alterations from those described herein can obviously be made without departing from the spirit of this invention, and the foregoing is to be considered purely as exemplary application thereof. The actual scope of the invention is to be indicated by reference to the appended claims.

In the claims, the term "air transporting impellers" is employed as denoting rotatable members such as conventional propellers, tilting propellers, shrouded propellers, ducted fans as well as turbines and the like employed, for instance, as the compressor portions of turbo-prop or turbo-jet engines which are driven by a fuel-consuming engine and which can introduce a net propulsive force to the aircraft.

I claim:

1. A fluid sustained vehicle having a central body portion with a pair of wings mounted on said body portion; a pair of fluid-transporting propulsive impellers mounted on said vehicle on opposite sides of said body portion; spanwise shaft means rotatably mounted on said wings substantially immediately adjacent to said wings and having an upper shaft surface exposed to the fluid flow, with said upper shaft surface moving rearwardly in a downstream direction to energize the flow of the upper surface of said wings; said shaft means interconnecting said propulsive impellers for effecting concurrent rotation of said impellers and said shaft means and propulsive impellers being energized for simultaneous rotation by a propulsive engine which consumes fuel carried by said aircraft.

2. An aircraft having a central body portion with a pair of wings mounted on said central body portion, with said wings having an upper surface, a leading edge and a trailing edge; a pair of air transporting propulsive impellers mounted on said aircraft one on each side of said body portion; a high lift rotor mounted on said wings for rotation about a rotor axis which is approximately parallel to one of said leading and trailing edges and approximately parallel to said upper surface, ahead of said trailing edge, with said rotor having an upper rotor surface portion located substantially immediately adjacent to a portion of said upper surface of said wing with said rotor surface portion moving in a rearward direction and exposed to the airflow of said wing for improving the high lift flow and boundary layer of said wing; and with said rotor interconnecting said propulsive impellers and acting as spanwise shaft means between said impellers to secure concurrent rotation of said impellers; said rotor and propulsive impellers being energized for simultaneous rotation by a propulsive engine which consumes fuel carried by said aircraft.

3. The aircraft of claim 2 further characterized in that said high lift rotor is mounted adjacent to the leading edge of said wing.

4. The aircraft of claim 2 further characterized in that said wing has a trailing edge flap, and in that said rotor is mounted between said trailing edge flap and said wing.

5. The aircraft of claim 2 further characterized in that said wing is mounted on a central fuselage body portion for selective wing tilt with respect to said fuselage about a spanwise wing tilt axis supported by said fuselage.

6. An aircraft having a central body portion with a pair of wings mounted on said central body portion with said wings having an upper surface, a lower surface and a leading edge; a pair of air transporting propulsive impellers mounted on said wings, one on each side of said central body portion with each of said impellers having an approximately chordwise impeller axis of rotation; a high lift rotor mounted on said wings adjacent to said leading edge for rotation about a rotor axis approximately parallel to said leading edge, and with said rotor having an upper rotor surface portion located substantially immediately adjacent to a portion of said upper surface of said wings with said rotor surface portion moving in a rearward direction and exposed to the airflow of said wing for improving the high lift flow of said wing, and with said rotor interconnecting said propulsive impellers acting as a spanwise shaft means between said impellers to secure concurrent rotation of said impellers, said rotor and propulsive impellers being energized for simultaneous rotation by a propulsive engine on said aircraft.

7. The aircraft of claim 6 further characterized in that said wings have a movable wing leading edge flap having a flap surface, with said rotor mounted on said wing between said wing and said leading edge flap; said flap being mounted for movement between a low drag high speed position in which the surfaces of said leading edge flap and said wing house said rotor in a faired low drag position, and a high lift slow speed flap position in which said flap is moved below said rotor with a portion of said flap located between said rotor and said lower surface of said wing.

8. The aircraft of claim 6 further characterized in that said wings have a movable leading edge flap having flap surfaces, with said rotor mounted between said leading edge flap and said wings, said flap being mounted for movement between a high-speed low drag position in which the surfaces of said flap and wings house and enclose said rotor in a faired disposition, and a slow speed high lift position in which said flap is forwardly and downwardly inclined with respect to said wing with the upper surface portion of said flap together with a forward rotor surface portion defining the walls of a converging slot therebetween for gaseous flows across said slot from below said wing to above said wing.

9. The aircraft of claim 6 further characterized in that said wings have movable leading edge flaps which move between a high speed low drag position in which they cover said rotor and smoothly fair said rotor with said wing, and a high lift slow speed position in which said flaps are moved to the rear of said rotor to a position adjacent to the surfaces of said wing.

10. The aircraft of claim 6 further characterized in that said wings are mounted on a central fuselage body for selective wing tilt with respect to said fuselage about a spanwise tilt axis supported on said fuselage, and in that a movable leading edge flap is provided in said wing for movement between a first position in which said flap covers said rotor in a faired disposition with said wing when said wing is positioned on said fuselage for high speed flight and a second position in which said flap is moved to a high lift position uncovering said rotor to the airstream when said wing is tilted at a substantial angle to said fuselage.

11. The aircraft of claim 6 further characterized in that said wings are mounted on a central fuselage body for selective wing tilt with respect to said fuselage about a spanwise tilt axis located at the rear portion of said wing and supported on said fuselage; said wing having a central forward spanwise portion which spans across and on top of said fuselage, with said rotor located at the leading edge portion of said central forward spanwise wing portion, said rotor being permanently exposed to the relative airstream of said wing when said wing is tilted with respect to said fuselage, and said rotor being faired into and by said fuselage when said wing is positioned on said fuselage for high speed flight.

12. The aircraft of claim 6 further characterized in that the cross-sectional shape of said rotor in a plane perpendicular to said rotor axis is approximately a triangular cross section.

13. An aircraft having a central body portion and a pair of wings mounted on said central body portion with said wings having an upper surface and a trailing edge flap; a pair of air-transporting impellers mounted on said wings one on each side of said body portion with each of said impellers having an approximately chordwise axle of rotation; a spanwise high lift rotor mounted between said wings and trailing edge flap, with said rotor having an upper rotor surface portion exposed to the airflow of said wings and moving in a rearward direction for improving said flow of said wings, and with said rotor interconnecting said propulsive impellers acting as a spanwise shaft means between said impellers to secure concurrent rotation of said impellers, said rotor and propulsive impellers being energized for simultaneous rotation by a propulsive engine which consumes fuel carried by said aircraft.

14. The aircraft of claim 13 further characterized in that said rotor is mounted on said wings adjacent to the leading edge of said flap.

15. The aircraft of claim 13 further characterized in that said rotor is mounted on said flap.

16. The aircraft of claim 13 further characterized in that said rotor is mounted at the leading edge of said flap with a portion of said rotor being elevated above said wing upper surface when said flap is deflected.

17. The aircraft of claim 13 further characterized in that said rotor is mounted on the leading edge of said flap and said flap is mounted on said wings for movement which translates the axis of rotation of said rotor in a chordwise direction with respect to said wing and each of said chordwise axles; each of said axles further characterized in that each has a rear end coupled to said translating axis, a flexible axle articulation, and an axially extensible axle portion which permits said rear end of each of said axles to remain coupled to said translating cylinder axis.

18. The aircraft of claim 13 further characterized in that said rotor is mounted at the leading edge of said flap and said flap is mounted at a separate fixed spanwise pivotal axis on said wing, and in that each of said axles of said impellers is connected to said rotor by an axle portion on said wing connected to a swivel gear positioned at said flap pivotal axis and thereafter to an axle portion mounted on said flap which flap mounted axle portion is coupled to said rotor.

19. The aircraft of claim 13 further characterized in that said rotor is a cylinder having cylinder segments with said cylinder mounted on said wing at a location immediately adjacent to the leading edge of said flap, said spanwise cylinder connected to said impeller axles at a bevel gear box supported by a bracket to said wing and substantially inside adjacent ends of said cylinder segments, with said flap connected to the box of said gear box by a fork bracket having two fork prongs embracing said box and pivotally connected to a pivotal axis in said box concentric to said cylinder and a fork arm projecting rearward from said gear box between said cylinder segments and supporting said flap for circular motion of said flap with respect to said wing around said cylinder axis.

20. The aircraft of claim 2 further characterized in that said impellers are ducted propellers mounted on the tips of said wings.

21. The aircraft of claim 2 further characterized in that said high lift rotor is divided into segments having cylindrical ends adjacent to each other and separated by a gap with said rotor supported by said wings by means of a fork bracket having a bracket fork arm penetrating between the adjacent ends of said cylinder segments into said gap and pivotally connected to the axis of rotation of said rotor segments with said bracket having a bracket fork prong pair external to said cylinder and attached to a frame portion of said wing; an auxiliary rotor having an axis of rotation approximately parallel to said axis of rotation of said high lift rotor and supported by said prong pair between said fork arm and said frame portion and a flexible belt embracing said auxiliary rotor between said auxiliary rotor and said frame to said high lift rotor, with said belt covering said gap between the adjacent ends of said high lift rotor segments.

References Cited in the file of this patent

UNITED STATES PATENTS

| | | |
|---|---|---|
| 1,849,547 | Marsan | Mar. 15, 1932 |
| 1,987,606 | Davis | Jan. 15, 1935 |
| 2,569,983 | Favre | Oct. 2, 1951 |
| 2,973,167 | Lake | Feb. 28, 1961 |